Oct. 12, 1926.
E. BUCKINGHAM
TAPER GAUGE
Filed April 23, 1923
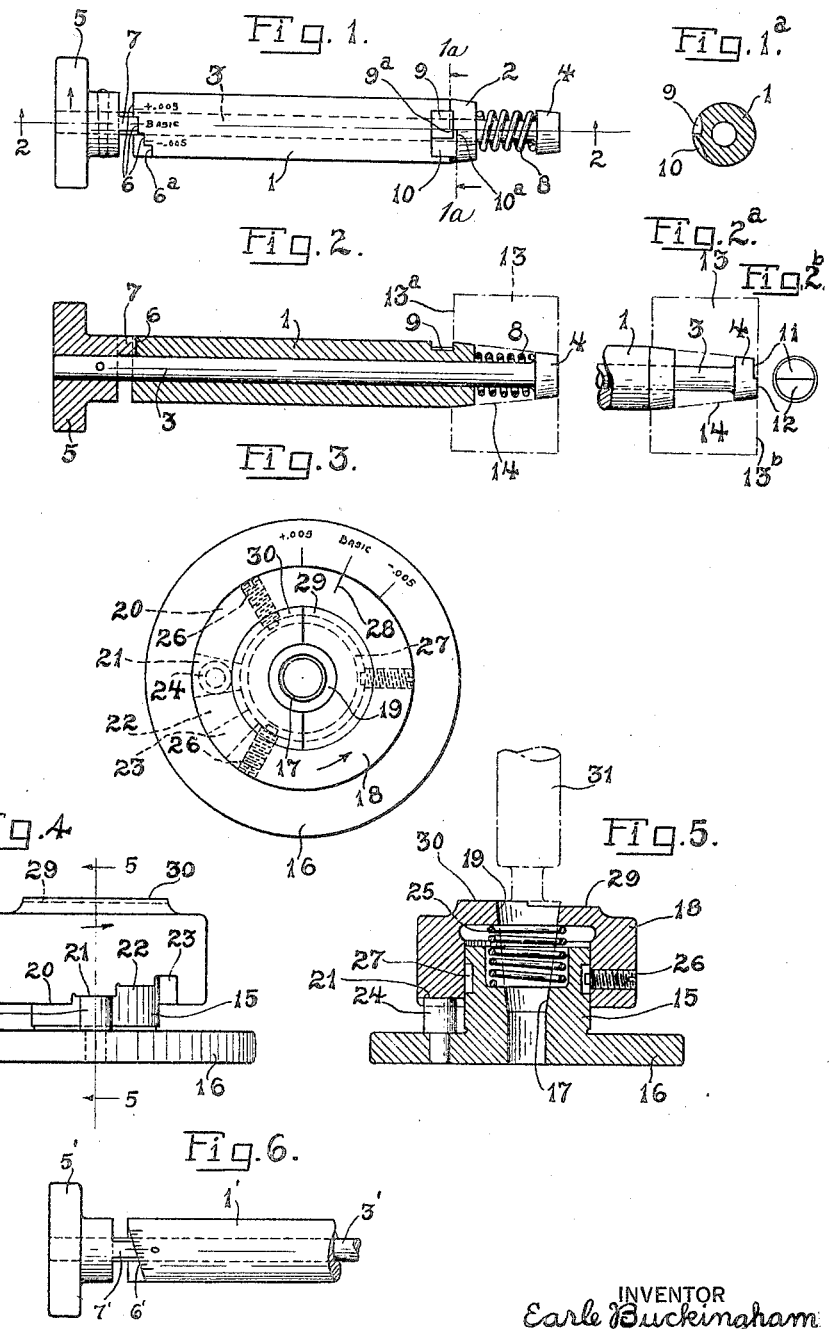
INVENTOR
Earle Buckingham
BY
ATTORNEY Patented Oct. 12, 1926.

1,602,645

UNITED STATES PATENT OFFICE.

EARLE BUCKINGHAM, OF HARTFORD, CONNECTICUT, ASSIGNOR TO PRATT & WHITNEY COMPANY, OF NEW YORK, N. Y., A CORPORATION OF NEW JERSEY.

TAPER GAUGE.

Application filed April 23, 1923. Serial No. 634,187.

This invention relates to gauges and particularly to gauges for testing the taper accuracy of conical surfaces. Such surfaces may be either internal or external and the gauge comprising my invention may be constructed to function on either form thereof. The primary object of the invention is to provide a gauge for quickly and accurately performing the function stated.

A further object of my invention is to provide a gauge of the type stated with additional means thereon for indicating the diameter accuracy of the surface being gauged.

With the above and other objects in view, my invention consists in the features of construction and operation set forth in the following specification and illustrated in the accompanying drawing. In such drawing annexed hereto and forming a part of this specification, I have shown certain embodiments of my invention but it will be understood that the invention can be otherwise embodied and that the drawing is not to be construed as defining or limiting the scope of the invention, the claims appended to this specification being relied upon for that purpose.

Referring to the figures of the drawing:

Figure 1 is an elevation of a gauge comprising one form of my invention adapted to test the accuracy of internal conical surfaces.

Fig. 1$^a$ is a cross section thereof on line 1$^a$—1$^a$ of Fig. 1.

Fig. 2 is a longitudinal sectional view of the gauge taken on line 2—2 of Fig. 1.

Fig. 2$^a$ is a fragmentary view similar to Fig. 2 but showing a slight modification thereof.

Fig. 2$^b$ is an end view of the gauge shown in Fig. 2$^a$.

Fig. 3 is a plan view of a gauge comprising another form of my invention adapted to test the accuracy of external conical surfaces.

Fig. 4 is a side elevation thereof.

Fig. 5 is a longitudinal sectional view taken on line 5—5 of Fig. 4.

Fig. 6 is a fragmentary elevation of the gauge shown in Fig. 1 slightly modified.

As illustrated in the drawing, my invention comprises two relatively spaced and relatively movable gauging members each having a gauging surface thereon adapted to contact with a portion of a conical surface to be gauged. As illustrated in the drawing, these gauging members are coaxial and their gauging surfaces are spaced to respectively engage spaced portions of the conical surface to be gauged. Means are provided on the members for indicating the conical or taper accuracy of the surface, such means functioning by the axial relative spacing of the said two members. One of the members is also provided with means for indicating the diameter accuracy of the surface. The drawing illustrates one form of gauge for testing internal conical surfaces or openings and another form of gauge for testing external conical surfaces. The invention illustrated will now be specifically described.

The gauge shown in Figs. 1 and 2 for testing internal conical surfaces will first be described. This gauge comprises a gauging member 1 in the form of a sleeve and having one end thereof tapered to provide a conical gauging surface 2. A second and coaxial gauging member comprises a rod 3 slidably mounted within the sleeve and having a conical gauging surface 4 at one end thereof. The surface 4 is spaced from and forms a continuation of the taper of the surface 2 and the gauging operation is performed by the cooperation of these two surfaces. An operating knob 5 is pinned to the opposite end of the rod 3.

The end of the sleeve adjacent the knob 5 is provided with a surface comprising a plurality of steps 6, the end of the sleeve providing one of such steps. These steps are adapted to be engaged by a projection 7 on the knob 5. A spring 8 mounted on the rod 3 between the gauging portions 2 and 4 normally holds these portions in the spaced position illustrated. The expansion of the spring 8 and therefore the spacing of the gauging portions are limited by the engagement of the projection 7 with the end of the sleeve. It will be noted that the intermediate step 6 is marked "Basic" and the steps at the opposite sides thereof are marked "+.005" and "—.005". A clearance notch 6$^a$ is also provided for a purpose hereinafter described. The purpose and function of these features will be hereinafter described.

It will furthermore be noted that in Figs. 1, 1$^a$ and 2, the sleeve 1 is notched at 9 and 10 to provide two shoulders 9ª and 10ª on the conical gauging surface 2 thereof. In Figs. 2ª and 2ᵇ, the end of the gauging portion 4 is notched to provide two spaced end surfaces 11 and 12 thereon. The function of these notched portions is to indicate the accuracy of the diameter of the openings being gauged. The method of using such notches in the gauging operation is hereinafter described.

In Fig. 2, the gauge is shown in operative engagement with a check ring 13 having a conical opening 14 therein of the accurate or basic taper which the gauge is designed to measure. It will be understood that the gauging surfaces 2 and 4 may become worn by use and such wear may in some cases be sufficient to effect the accuracy of the gauge. The function of the check ring 13 is to test the gauge to determine its accuracy.

In originally constructing the gauge, the gauging elements 1 and 3 are axially spaced to the position they would assume when the combined surfaces 2 and 4 are in position to form a true cone of the taper which the gauge is constructed to measure. With the parts secured in this relative position, the step 6 marked "Basic" is formed on the sleeve flush with the end of the projection 7. An adjacent higher step representing .005 over-taper and another adjacent and lower step representing .005 under-taper are provided on the sleeve. It will be understood that if the conical opening being tested is of accurate taper, as is the opening 14, the insertion of the gauge into the opening will compress the spring 8 sufficiently to bring the end of the projection 7 flush with the basic step. If the opening is over-tapered or too steep, the gauging portion 4 cannot extend so far into such opening and the spring will be further compressed to move the end of projection 7 beyond the basic step. If the opening is under-tapered, the gauging portion 4 will extend further into the opening and the spring will not be compressed sufficiently to bring the end of the projection 7 flush with the basic step.

The operation of the gauge shown in Figs. 1 and 2 is as follows: The gauge is first adjusted to seat the projection 7 in the notch 6ª, the parts being held in such position by means of the spring 8. The gauge is then fully inserted into the conical opening to be tested, as shown in Fig. 2. Such action will operate to compress the spring 8 and move the knob 5 away from the sleeve 1, unless the opening is considerably under-tapered. The spring being compressed, the operator rotates the knob in the direction of the arrow, relative to the sleeve 1 and the resulting position of the projection 7 indicates the taper accuracy of the opening. Should the projection remain in the notch 6ª, the opening is under-tapered beyond the limit and would be rejected. Should the projection be moved to seat on or above the +.005 step, the opening is over-tapered beyond the limit and would be rejected. If the projection is on the basic step or between the basic step and one of the adjacent steps, the opening is within the limits allowed and would be accepted.

As heretofore stated, the gauging portion 2 of the sleeve 1 is provided with two notches 9 and 10 providing two shoulders 9ª and 10ª for gauging the diameter of the opening. These two shoulders represent the two diameter limits of measurement allowed. In operation, the diameter of the opening is measured by the position assumed by the shoulders 9ª and 10ª relative to the inner face 13ª of the piece being gauged. Should the gauge assume a position in this opening bringing the face 13ª flush with either shoulder or between such shoulders, the diameter is within the limits allowed. However, should the face 13ª be outside the limit 9ª, the opening is too large and would therefore be rejected. Should the face 13ª be outside the limit 10ª the opening is too small and would be rejected.

Certain work may require the measuring of the diameter of the opening from the smaller end thereof instead of from the larger end as just described. For this purpose, the gauging portion 4 may be provided with the end surfaces 11 and 12 as heretofore described. The operation of the gauge with these limits is the same as that just described in reference to the limits 9ª and 10ª. In operation, should the end face 13ᵇ come flush with or between the limits 11 and 12, the diameter of the opening, measured from the smaller end thereof is within the limits allowed. However, should the face 13ᵇ be without these limits, the diameter is inaccurate beyond the limit allowed and would therefore be rejected.

The gauge shown in Figs. 1 and 2 is adapted to function as a limit gauge, namely, to indicate a certain predetermined plus or minus inaccuracy. It may be desired in some instances to accurately indicate the amount of plus or minus inaccuracy of taper of the surface being gauged. This function can readily be performed by a gauge constructed in the manner indicated in Fig. 6. This construction is substantially the same as that shown in Fig. 1 and the like parts thereof have in Fig. 6 been given the same reference characters but differentiated from those in Figs. 1 and 2 by being primed. However, instead of providing the end of the sleeve with a stepped surface 6, as in Fig. 1, the same is provided with a spiral surface 6′ against which the projection 7′ is adapted to engage. These cooperating engaging portions are graduated as indicated and the inaccuracy of taper can be readily and minutely determined by reading the index mark on the projection 7' against the adjacent scale on the end of the sleeve 1'.

In Figs. 3, 4 and 5 I have shown another form of my invention adapted to test the accuracy of external conical surfaces. This mechanism comprises a gauging member 15 having a broad supporting base 16 and an internal conical gauging surface or opening 17. A second gauging member 18 is mounted to slide coaxially over the member 15 and has an internal conical gauging surface or opening 19 coaxially of the surface 17. The surface 19 is spaced from and, in its basic position, forms a continuation of the taper of the surface 17. The gauging operation is performed by the cooperation of these two surfaces.

The lower edge of the member 18 is provided with three steps 20, 21 and 22 thereon axially advanced slightly relatively to each other and a notch 23 adjacent the step 22. These steps are adapted to engage a pin 24 seated in the base 16. A spring 25 within a recess in the member 15 normally holds the gauging portions in the spaced position, relative axial movement of the members in both directions being limited by three pins 26 threaded into the member 18 and extending into an annular groove 27 in the member 15.

For convenience in operation, the base 16 is provided with three index marks "—.005", "Basic" and "+.005" thereon corresponding to the three steps 20, 21 and 22. An index mark 28 is provided on the member 18 for cooperating therewith. As shown in Figs. 3 and 4, the mark 28 registers with or is adjacent the basic mark when the intermediate or basic step 21 is on the pin 24. In like manner the "—.005" mark corresponds with the step 20 and the "+.005" with the step 22. The upper end of the member 18 is also cut away to provide two levels or shoulders 29 and 30 for indicating the diameter accuracy of the part being gauged. These shoulders represent the two limits of diameter allowed as has been described above in reference to Figs. 2ᵃ and 2ᵇ. The principle of operation of this device is the same as that above described in reference to Figs. 1 and 2.

The operation of the gauge shown in Figs. 3, 4, and 5 is as follows: The gauging members are first adjusted to place the notch 23 over the pin 24. The part to be tested, as the master plug gauge 31 shown in Fig. 5, is then fully inserted into the openings 17 and 19. The spring 25 will thereby be compressed a distance depending upon the taper condition of the part being gauged. The operator then rotates the member 18 on the member 15 in the direction of the arrow and the resulting position of the pin 24 indicates the taper accuracy of the part 31 being gauged. This result can be quickly read from the indicating marks on the members as heretofore described. It will also be understood that the diameter accuracy of the part is indicated by the limits 29 and 30. The method of reading these results is the same as above described in reference to the gauge shown in Figs. 1 and 2 and therefore will not be further described herein.

The gauge herein shown and described is designed particularly as a quick-acting and quick-reading gauge which can be easily operated by unskilled help. In the gauging operation, it is only necessary to engage the gauge with the conical surface to be tested and turn the movable gauging member in the direction of the arrow as described. The parts thereupon readily assume the position which clearly indicates the accuracy of both the taper and diameter of such surfaces. As illustrated, the gauge is adapted to be constructed with certain different "+" and "—" limits and the use of the gauge readily determines whether the part being tested comes within such limits.

What I claim is:

1. A gauge for testing the taper of conical surfaces comprising in combination, a gauging member having a conical gauging surface adapted to contact with a portion of the conical surface to be gauged, a second gauging member movable upon and axially relative to said first member and having a conical gauging surface spaced from the first gauging surface and adapted to contact with another portion of the conical surface to be gauged, and interengaging stop means on the two members, the engaging position of the said means being adapted to indicate the accuracy of the surface being gauged by indicating the relative spacing of the two members.

2. A gauge for testing the taper of conical surfaces comprising in combination, a gauging member having a conical gauging surface adapted to contact with a portion of the conical surface to be gauged, a second gauging member movable upon and axially relative to said first member and having a conical gauging surface adapted to contact with another portion of the conical surface to be gauged, the said members being coaxial, one of said members being provided with a stop and the other with a surface adapted to cooperate with said stop, the said surface having portions thereof at different axial positions along the member whereby engagement thereof by the stop will correspond to the spacing of the gauging members in different relative axial positions.

3. A gauge for testing the taper of conical surfaces comprising in combination, a gauging member having a conical gauging surface adapted to contact with a portion of the conical surface to be gauged, a second gauging member having a conical gauging surface spaced from the first gauging surface and adapted to contact with another portion of the conical surface to be gauged, the said members being coaxial, a spring coaxial with the members and operating to normally hold the said gauging surfaces in spaced relation, and means cooperating with the members for indicating the conical or taper accuracy of the said conical surface.

4. A gauge for testing the taper of conical surfaces comprising in combination, a gauging member having a conical gauging surface adapted to contact with a portion of the conical surface to be gauged, a second gauging member having a conical gauging surface adapted to contact with another portion of the conical surface to be gauged, the said members being coaxial, one of said members being provided with a stop and the other with a surface adapted to cooperate with said stop, the said surface having portions thereof at different axial positions along the member whereby engagement thereof by the stop will correspond to the spacing of the gauging members in different relative axial positions, and a spring cooperating with the members and operating to normally hold the said gauging surfaces in spaced relation and the stop in contact with the said surface.

5. A gauge for testing the taper of conical surfaces comprising in combination, a gauging member having a conical gauging surface adapted to contact with a portion of the conical surface to be gauged, a second gauging member having a conical gauging surface movable upon the first gauging member and adapted to contact with another portion of the conical surface to be gauged, said members being movable axially toward or from each other, one of said members being provided with a plurality of stepped surfaces thereon, and means on the other member for engaging the stepped surfaces and adapted to indicate thereby the spacing of the gauging surfaces and the taper accuracy of the surface being gauged.

6. A gauge for testing the taper of conical surfaces comprising in combination, a gauging member having a conical gauging surface adapted to contact with a portion of the conical surface to be gauged, a second gauging member having a conical gauging surface movable upon the first gauging member and adapted to contact with another portion of the conical surface to be gauged, said members being axially movable toward or from each other, one of said members being provided with a plurality of axially stepped surfaces thereon, and means on the other member for engaging the stepped surfaces and adapted to indicate thereby the spacing of the gauging surfaces and the taper accuracy of the surface being gauged, one intermediate step and the cooperating parts of the gauge being so constructed that when the last named means is seated on the said one step, the gauging members are spaced to indicate a predetermined taper and when the said means is seated on other steps, the gauging members are relatively spaced in one direction or the other to indicate plus or minus variations thereof.

In testimony whereof, I hereto affix my signature.

EARLE BUCKINGHAM.